No. 619,482. Patented Feb. 14, 1899.
J. HIGGINBOTTOM.
PROCESS OF SEPARATING GRANULAR MATERIALS.
(Application filed July 10, 1895.)
(No Model.) 2 Sheets—Sheet 2.
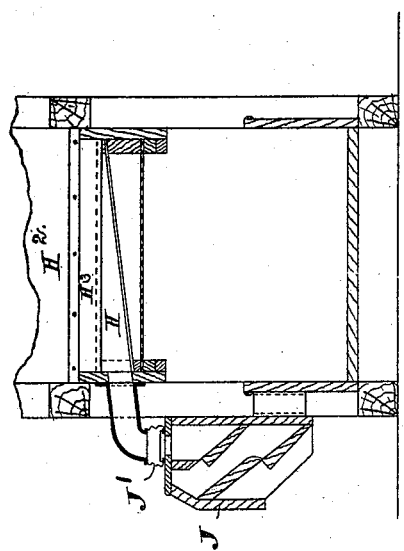
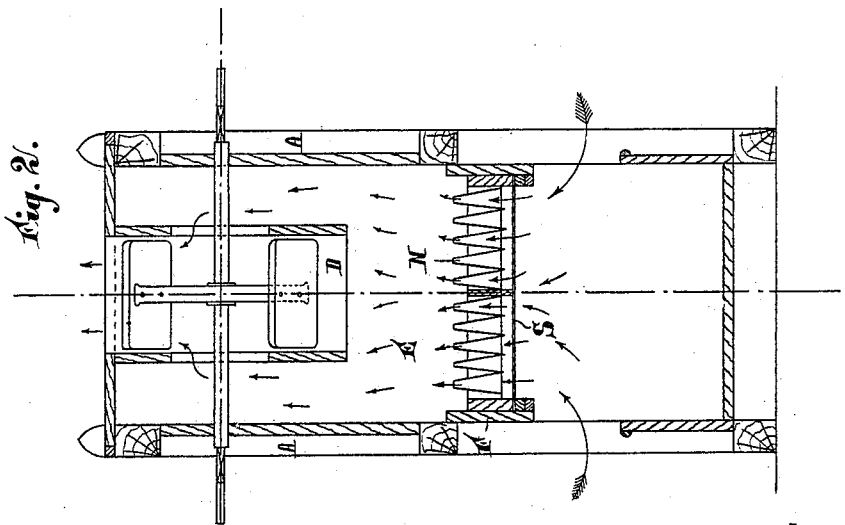
Witnesses
M. V. Bidgood
J. Green
Inventor
James Higginbottom
By
Knight Bros
Attys.

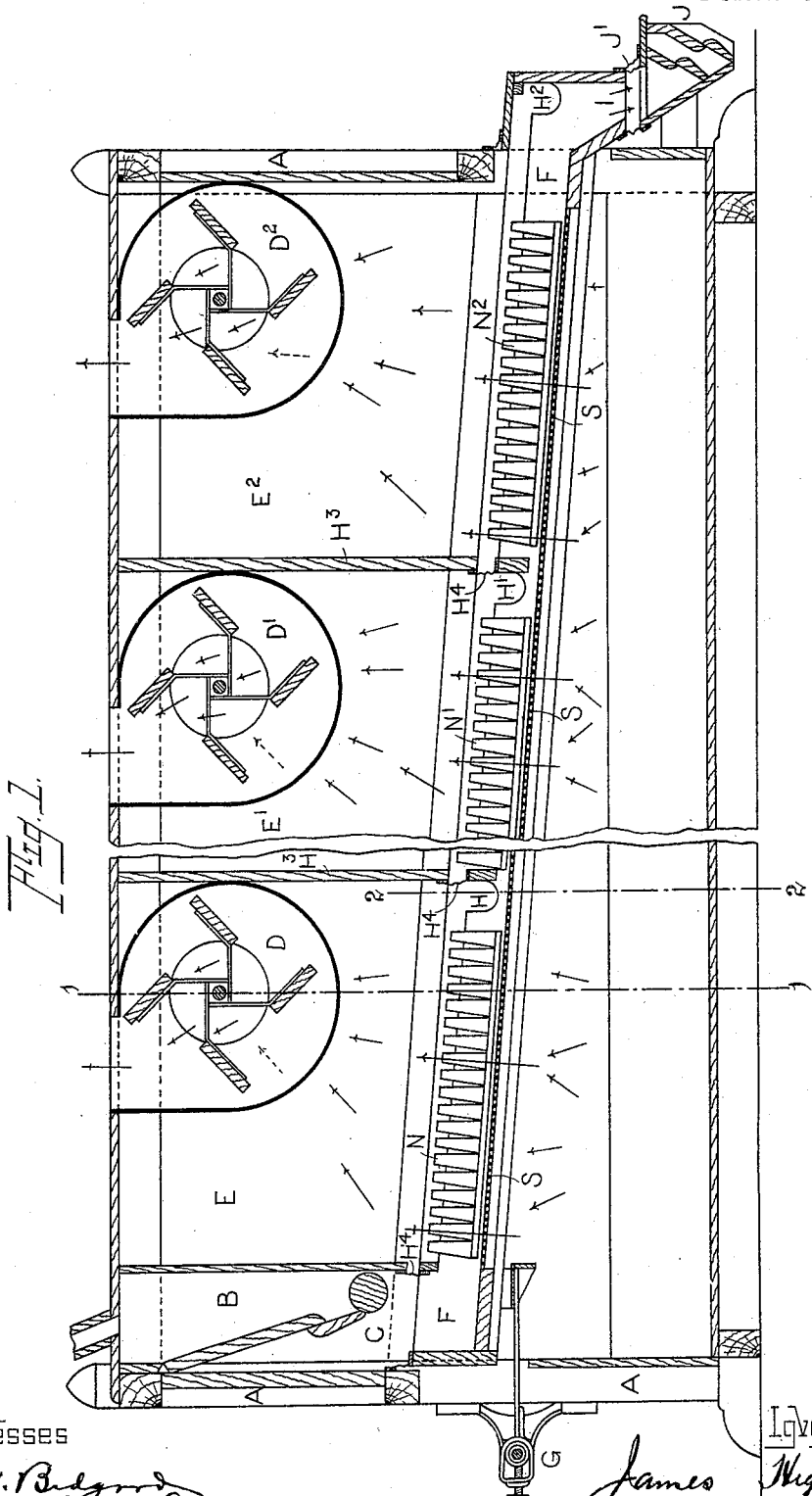

UNITED STATES PATENT OFFICE.

JAMES HIGGINBOTTOM, OF LIVERPOOL, ENGLAND.

PROCESS OF SEPARATING GRANULAR MATERIALS.

SPECIFICATION forming part of Letters Patent No. 619,482, dated February 14, 1899.

Application filed July 10, 1895. Serial No. 555,519. (No specimens.)

*To all whom it may concern:*

Be it known that I, JAMES HIGGINBOTTOM, a subject of the Queen of Great Britain, residing at Liverpool, in the county of Lancaster, in the Kingdom of England, have invented certain new and useful Improvements in Processes of Separating Granular Materials, of which the following is a specification.

My invention is for a new method of separating or purifying grain, cereals, wheat, semolina, middlings, dunst, and the like in machines having rotary or vibrating sieves in which a gauze sieve-surface is used having currents of air passing in an upward direction through the same. In the present existing practice such machines are arranged with a gauze sieve-surface having meshes larger than a part of the material which is passing to the machine to be treated. In other words, the gauze covering on the sieve is arranged with a mesh sufficiently large that a part of the feed material may pass through such mesh into a chamber or receptacle below the sieves. The air-currents are applied with such force or intensity that the material as it is in the act of passing through the hole of the mesh is met with an uprising current of air which is passing in an opposite direction to the falling particles and in such a manner that at the instant of the passage of a particle the speed of the uprising air-current is intensified in passing through the hole in proportion as the area of the hole is obstructed by the downward-passing particle. Thus the current of air in passing through the hole between the threads of the mesh and the sides of the passing or falling particle itself is increased in velocity, and, as is well known in these machines, the air-currents can be set so that the velocity of the air-current at the particular moment described shall be just such as will allow a particle of a heavier specific gravity to fall through the hole into the chamber below, but too powerful to permit a similar size of particle of a less specific gravity passing through the hole. By such method a separation or purification is effected between the particles, such separation being made according to the velocity of the air-currents and the differences between the specific gravities of the particles. In this method of separation or purification the sizes of the mesh and the velocity of the wind-current are varied to suit the size and nature of the particles; but in all cases the separation or purification is done by an uprising current of air passing through a hole and the purified particles of heavier specific gravity passing downward through the same hole, while at the same time the uprising air prevents the particles of a lighter specific gravity from falling through the hole and carries them into depositing-surfaces, such as channels or trays of nozzles placed above the sieve. It is obvious that in this, the ordinary method of separation or purification, the velocity of the air-currents ascending through the holes in the mesh must not be so great as will prevent the heavier particles from falling through the hole and that the velocity of the uprising air available for carrying away and depositing material of a lighter specific gravity in the channels or nozzle-trays above the sieve is restricted or limited by the weight of the heavier particles, which must be allowed to fall through the holes in the sieve.

By means of my invention I am enabled to use an unrestricted velocity of ascending air for the purpose of separating and depositing particles of a less specific gravity in the channels or nozzle-trays placed over the sieve, and I consequently attain a more effectual and delicate separation. Also I am thereby enabled to make separations between particles which are of the same size and shape, but of a different specific gravity. To effect this result I make the meshes of the gauze covering of the sieve smaller than the material to be separated. In other words, I arrange so that the material to be separated or purified cannot pass through the meshes of the gauze covering, and I cause the air-currents to rise up through these smaller meshes with a velocity sufficient to lift the particles of lighter specific gravity out of the particles of heavier specific gravity onto a collecting-tray of nozzles or channels or other surfaces placed in a chamber or compartment above or contiguous to the material moving over the sieve. I also make the sieve of a sufficient length so that the particles to be lifted have a length to travel under the action of the uprising air-current which is passed through the sieve such as is found to be sufficient to accomplish the desired degree of separation. In other words, if a particle entering the sieve arrives at one of these smaller holes and if the wind rising through that particular hole fails to lift out the desired particle such particle must pass onto the next succeeding hole upon the sieve, where it is again met with a similar uprising current, so that if the particle to be extracted does not become removed at the first or second or third hole over which it is passing its removal may be accomplished at some other point lower down the sieve, and my new method enables me to bring the particle under the action of the air-current until it becomes removed to a certainty. In some cases I place more than one set of collecting-trays of nozzles and chambers or compartments above the sieve in such manner that the material moving on the sieve may be subjected to any desired velocity of air-current in any of the compartments for the purpose of separating material of a different specific gravity in each compartment. These objects are attained by the apparatus illustrated in the accompanying drawings, in which—

Figure 1 is a longitudinal section of a machine adapted to carry out my process. Fig. 2 is a transverse section of a machine on the line 1 1 of Fig. 1. Fig. 3 is a transverse section of a portion of the machine on the line 2 2 of Fig. 2.

Like letters represent like parts in the drawings.

A is the framework or casing of the machine; B, the hopper for the material to be separated or purified; C, the feed-roller.

D D' D² are exhaust-fans placed above the sieve in the chambers or compartments E E' E².

F is a reciprocating-sieve frame which is suspended by hangers to the frame A and made to vibrate by means of the eccentric G.

S is the gauze-covered sieve.

N N' N² are trays of nozzles or channels placed over the sieve for collecting the separated material.

H H' H² are the channels through which the separated material is discharged.

I is the discharge for the tailings of the sieve.

J is the discharge-box, with hanging flaps therein arranged for the purpose of permitting the material to be discharged and to prevent the air from passing.

H³ are air-tight partitions between the compartments E, E', and E².

H⁴ are flexible air-tight connections from the partitions to the vibrating sieve.

The following is an example of separating or purifying upon my new method, and for the purpose of clearly explaining the method I describe how I treat semolina, which will pass through Grits's gauze-silk having a mesh of sixteen threads per inch and which will not pass through Grits's gauze-silk having a mesh of eighteen threads per inch. To separate or purify such semolina, I clothe the sieve with Grits's gauze-silk having a mesh of twenty threads per inch or, in other words, of such a degree of fineness of mesh as will prevent the semolina from passing downward through the sieve. The semolina enters by the feed-hopper B and is distributed over the sieve S by the feed-roller C. The semolina travels down the sieve, and the exhaust-fans D D' D² cause an air-current to pass upward through the sieve with such a velocity as will separate and lift the semolina of lighter specific gravity upon the nozzle collecting-trays N N' N². The semolina of heaviest specific gravity remains upon the sieve, and it becomes discharged over the tail I of the sieve through the discharge-box J to the outside of the machine. By revolving the exhaust-fans D, D', and D² at different speeds the air-currents rising through the sieve may be varied in each compartment. Thus the material separated and deposited on the nozzle-tray N may be lighter in specific gravity than the material separated and deposited in the nozzle-tray N' or N². The air in compartment E enters the fan D, as shown by the arrows on Fig. 2. The fan discharges the air from thence to the outside of the machine.

My invention is applicable to all forms of vibrating or rotary sieves which are used for the purposes of separating wheat or other grain or for purifying semolina and middlings or the like in which currents of air are used for the purpose of separating, purifying, or cleansing the wheat from light material—such as dust, chaff, and light inferior wheat-seeds or refuse—or for separating and purifying broken wheat, semolina, middlings, dunst, or the like, also for the purpose of separating small and light particles from coarse particles in ground or pulverized material from grinding-mills.

The utility or the value of the invention is based mainly upon the possibility for the miller to use more efficient currents of air. Until now the intensity of the air-current used could not be increased so far as to prevent the pure semolina or dunst from falling through the sieve. When using too strong an air-current, a great deal of the so-called "pure" or "best" semolina remained upon the sieve. When using too weak an air-current, it frequently happened that also less valuable particles (overtails) passed through the sieve. As regards the required intensity of air-currents the user of such apparatus is much more at liberty to work with air-currents of suitable strength. He will be in the position to use a stronger current, and thereby be able to eliminate with certainty all bran particles. The sieve with small meshes divides more regularly the air-current passing through the sieve, and thereby cannot act but favorably for the separation of the heavier and lighter particles. It seems scarcely necessary to mention that the effect of the apparatus for purifying semolina and dunst depends in first line upon the suitable proportion of the strength of the air-current to the size of the semolina or dunst, but also in a considerable extent upon the quality of the semolina, whether the latter is from a soft or from a hard wheat, so that even with an excellent apparatus sometimes the result may be an unsatisfactory one. This apparatus, however, allows an easy and perfect accommodation to all the requirements which are conditional for a favorable treatment of special material to be purified.

The power afforded to the user under the process herein described of subjecting the material to a prolonged or continued action of stronger air-currents during its passage along the sieve constitutes a valuable improvement in purification, differing, as it does, from the ordinary sieve purifier, in which the material passes through the meshes of the sieve and in which the strength of the air-current must be so set that it will not prevent the material from passing downward through the meshes, whereas in this process the material is kept upon the sieve, and the miller is thereby enabled to use a much stronger and far more prolonged air-current action on the material; also, such prolonged action will enable the miller to obtain separations of specific gravity with more certainty and exactness than can now be obtained from the aspirating or gravity purifier, in which the period of exposure to air is necessarily of the briefest. This invention provides for a much longer exposure to air force during the travel to which he subjects the material, and the process allows of the application of varying air-currents in a highly-practical manner. Moreover, under certain conditions which arise in grading semolina, middlings, or other material when flour of highest quality and specific gravity is sought it provides a method of great practical utility, whereby such material can be raised to a level of purity and of value which has not hitherto been attainable by any known means of purification.

I claim—

1. The process of separating granular materials which consists in dividing an upward current of air at a given plane into a vast number of parallel currents, each smaller in diameter than the granules of the material to be separated, then passing the materials to be separated through the divided current of air immediately above this plane and forming quiet places above said plane into which the current can spread, whereby the fine dust and lighter particles are separated from the granular material; the fine dust being carried off by the current and the lighter particles collected in the quiescent spaces, substantially as set forth.

2. The herein-described process of separating and purifying granular materials, which consists in supporting the material upon a sieve or screen of smaller mesh than the size of the grains of the material, then subjecting the material to the action of an upward current of air passed through the sieve or screen, thereby separating the lighter particles from the material being treated, and finally collecting such lighter particles in quiescent spaces, substantially as set forth.

3. The herein-described process of separating and purifying grain or other granular material, which consists in passing the material to be treated over a sieve or screen of finer mesh than the grains of the material, subjecting the material to upward currents of air (passed through the sieve) of continually-increasing strength as the material passes onward, and separately collecting the finer particles separated from the material by the different strengths of air-currents, substantially as set forth.

In testimony whereof I have signed my name to this specification in the presence of two subscribing witnesses.

JAMES HIGGINBOTTOM.

Witnesses:
 G. C. DYMOND,
 W. H. BEESTON.